US012738259B2

(12) United States Patent
Papakostas et al.

(10) Patent No.: US 12,738,259 B2
(45) Date of Patent: Sep. 15, 2026

(54) METHOD TO DISRUPT GENERATION QUALITY OF DEEP AUDIO GENERATION MODELS

(71) Applicant: SourceAudio Holdings, LLC, Redondo Beach, CA (US)

(72) Inventors: Michalis Papakostas, Chicago, IL (US); Brent Phillips, Glendale, CA (US); Andrew Harding, Sherman Oaks, CA (US); Ryan Johnson, Boulder, CO (US); Brad-Lee Nichols, Gardiner, ME (US)

(73) Assignee: SourceAudio Holdings, LLC, Redondo Beach, CA (US)

( * ) Notice: Subject to any disclaimer, the term of this patent is extended or adjusted under 35 U.S.C. 154(b) by 98 days.

(21) Appl. No.: 18/731,068

(22) Filed: May 31, 2024

(65) Prior Publication Data

US 2025/0329322 A1 Oct. 23, 2025

(30) Foreign Application Priority Data

Apr. 23, 2024 (GR) ....................... GPA20240100295

(51) Int. Cl.
*G10K 15/02* (2006.01)
*G06N 20/00* (2019.01)

(52) U.S. Cl.
CPC ............. *G10K 15/02* (2013.01); *G06N 20/00* (2019.01)

(58) Field of Classification Search
CPC .............. H04N 21/23892; G06F 3/165; G10L 19/018; G10L 15/16; G11B 20/00884; G11B 20/00891; G10K 15/02; G06N 20/00
See application file for complete search history.

(56) References Cited

U.S. PATENT DOCUMENTS

2023/0229789 A1* 7/2023 Wu ......................... G06F 21/60 726/26

OTHER PUBLICATIONS

Pavlovic et al., "Robust speech watermarking by a jointly trained embedder and detector using a DNN", Digital Signal Processing vol. 122,103381,p. 1-12, Apr. 15, 2022 (Year: 2022).*
Chen et al., "WavMark: Watermarking for Audio Generation", internet:<https://arxiv.org/abs/2308.12770>, arXiv:2308.12770, p. 1-13, Jan. 7, 2024 (Year: 2024).*

* cited by examiner

*Primary Examiner* — Vivian C Chin
*Assistant Examiner* — Shin Lee
(74) *Attorney, Agent, or Firm* — Lowenstein Sandler LLP

(57) ABSTRACT

An audio signal is segmented into a plurality of audio signal segments. A plurality of modified audio signal segments are generated based on processing data from the plurality of audio signal segments using a trained machine learning model. The plurality of modified audio signal segments are indistinguishable from the plurality of audio signal segments to the average human listener. A reconstructed audio signal corresponding to the audio signal is generated by combining the plurality of modified audio signal segments. The reconstructed audio signal is indistinguishable from the audio signal to the average human listener but, when used to train a generative machine learning model, constrains an ability of the trained generative machine learning model to generate new audio signals similar to the audio signal.

20 Claims, 7 Drawing Sheets

AUDIO MODIFICATION MODULE 170

PREPROCESSING MODULE 272

LOUDNESS DETECTION COMPONENT 202

SEGMENTATION COMPONENT 204

SEGMENT DECOMPOSITION COMPONENT 206

MACHINE LEARNING (ML) MODULE 274

SPECTROGRAM-BASED ENCODER ML MODEL 212

AUDIO-BASED ENCODER ML MODEL 216

SPECTROGRAM-BASED DIFFUSION ML MODEL 214

AUDIO-BASED DIFFUSION ML MODEL 218

RECONSTRUCTION MODULE 276

SEGMENT RECONSTRUCTION COMPONENT 232

AUDIO RECONSTRUCTION COMPONENT 234

LOUDNESS MATCHING COMPONENT 236

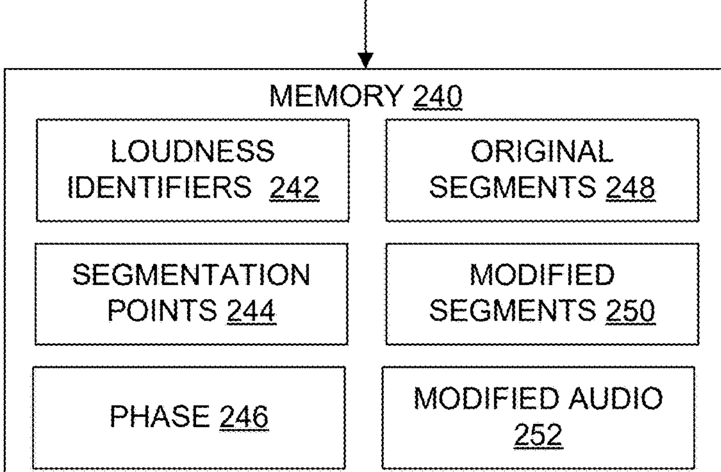

Figure 3:
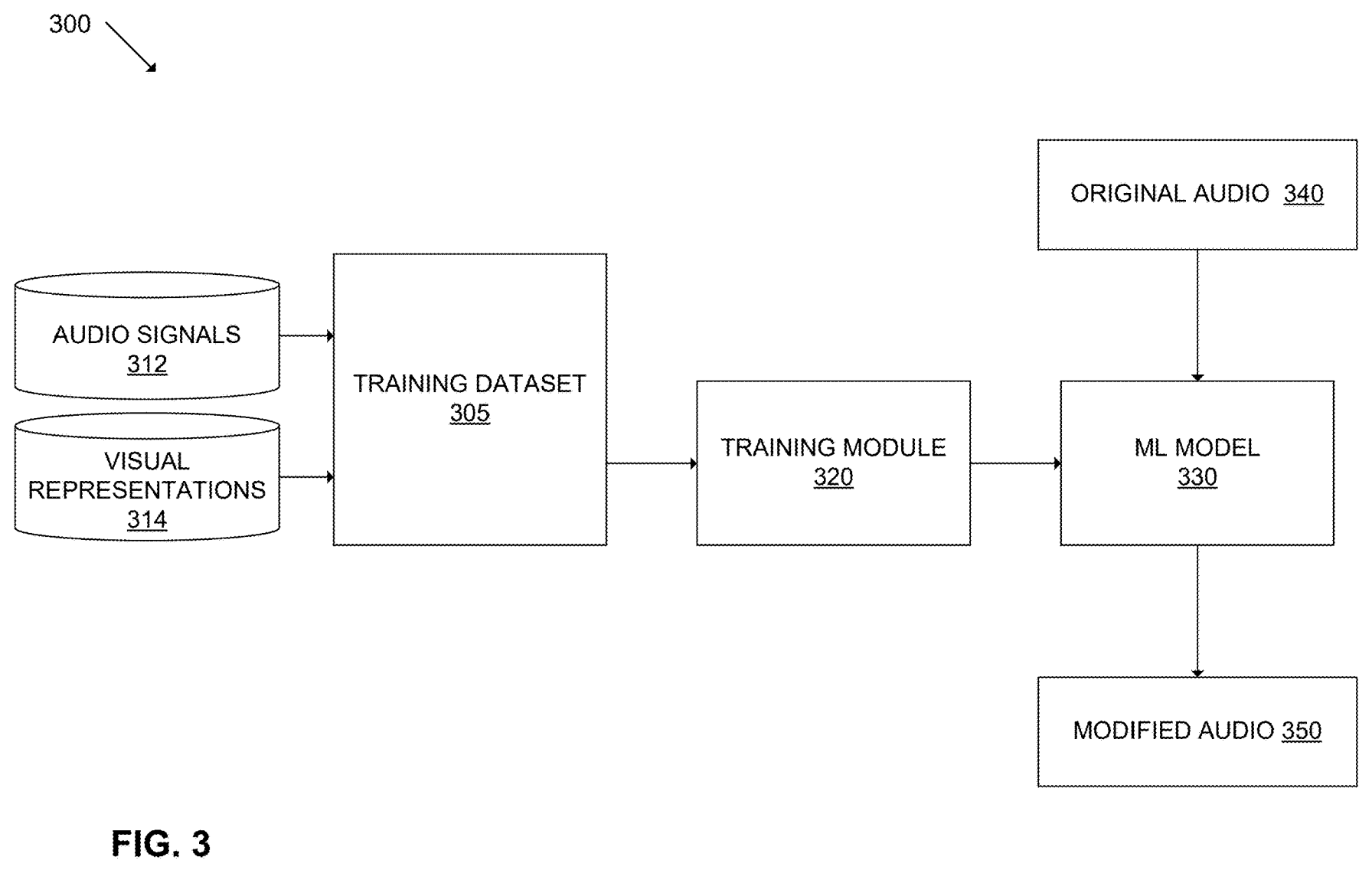

AUDIO SIGNALS 312

VISUAL REPRESENTATIONS 314

TRAINING DATASET 305

TRAINING MODULE 320

ORIGINAL AUDIO 340

ML MODEL 330

MODIFIED AUDIO 350

Segment an audio signal into a plurality of audio signal segments.
410

Generate a plurality of modified audio signal segments based on processing data from the plurality of audio signal segments using a trained machine learning mode, wherein the plurality of modified audio signal segments are indistinguishable from the plurality of audio signal segments to an average human listener.
420

Generate a reconstructed audio signal corresponding to the audio signal by combining the plurality of modified audio signal segments, wherein the reconstructed audio signal is indistinguishable from the audio signal to the average human listener but, when used to train generative machine learning models, constrains the ability of the trained generative machine learning model to generate new audio signals similar to the audio signal.
430

FIG. 4

Spectrogram of Original Audio Sample 510A
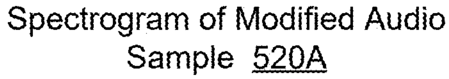
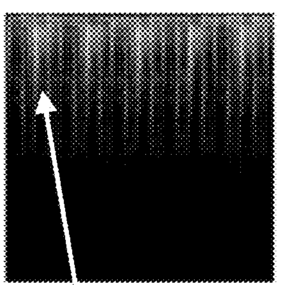
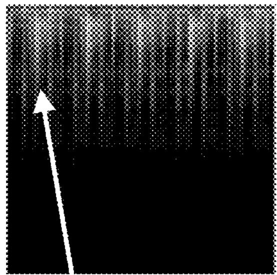
Spectrogram of Original Audio Sample 510B
Spectrogram of Modified Audio Sample 520B
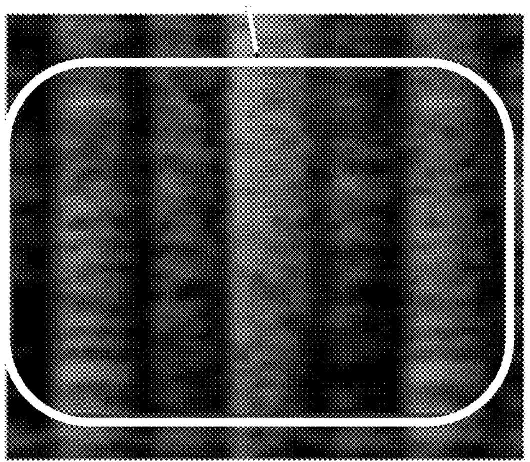
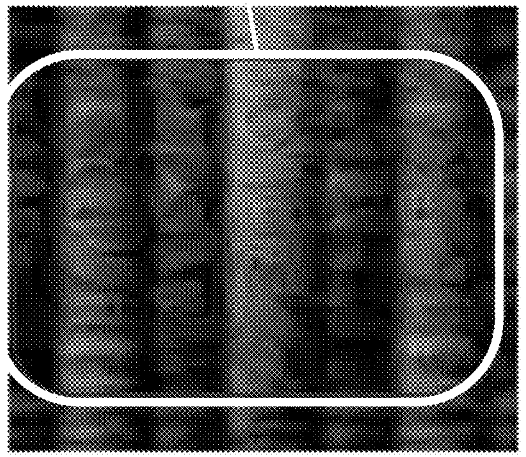
FIG. 5

METHOD TO DISRUPT GENERATION QUALITY OF DEEP AUDIO GENERATION MODELS

RELATED APPLICATIONS

This application claims priority to Greek Patent Application No. GPA20240100295, filed Apr. 23, 2024, titled "Method to Disrupt Generation Quality of Deep Audio Generation Models," the entirety of which is incorporated herein by reference.

TECHNICAL FIELD

This disclosure relates to the field of generative artificial intelligence, and in particular to disrupting generation quality of deep audio generation models.

BACKGROUND

The emergence of generative artificial intelligence (AI) models has revolutionized the way in which users create and interact with digital content. The creators of digital content are at the epicenter of the impact of generative AI. Digital content creators face the unprecedented challenge of protecting their intellectual property and securing their copyrights from unauthorized mimicry of their work. For example, diffusion-based models, such as latent diffusion models, can generate remarkably realistic content that mimics existing copyrighted works. Protecting copyrighted works using existing legal recourse can be time-consuming, difficult, and expensive. Thus, a technology-based approach to protecting copyrighted works from being reproduced by generative AI models can provide an alternative solution to copyright infringement protection.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

FIG. 2A is a block diagram illustrating an audio modification module, according to some embodiments of the present disclosure.

FIG. 3 is a workflow diagram for training a machine learning model to generate a modified audio sample, according to embodiments of the present disclosure.

FIG. 4 is a flow diagram illustrating a method for generating a modified audio sample, according to some embodiments of the present disclosure.

FIG. 5 illustrates the effects of the audio modification system on a spectrogram, according to embodiments of the present disclosure.

DETAILED DESCRIPTION

Figure 1:
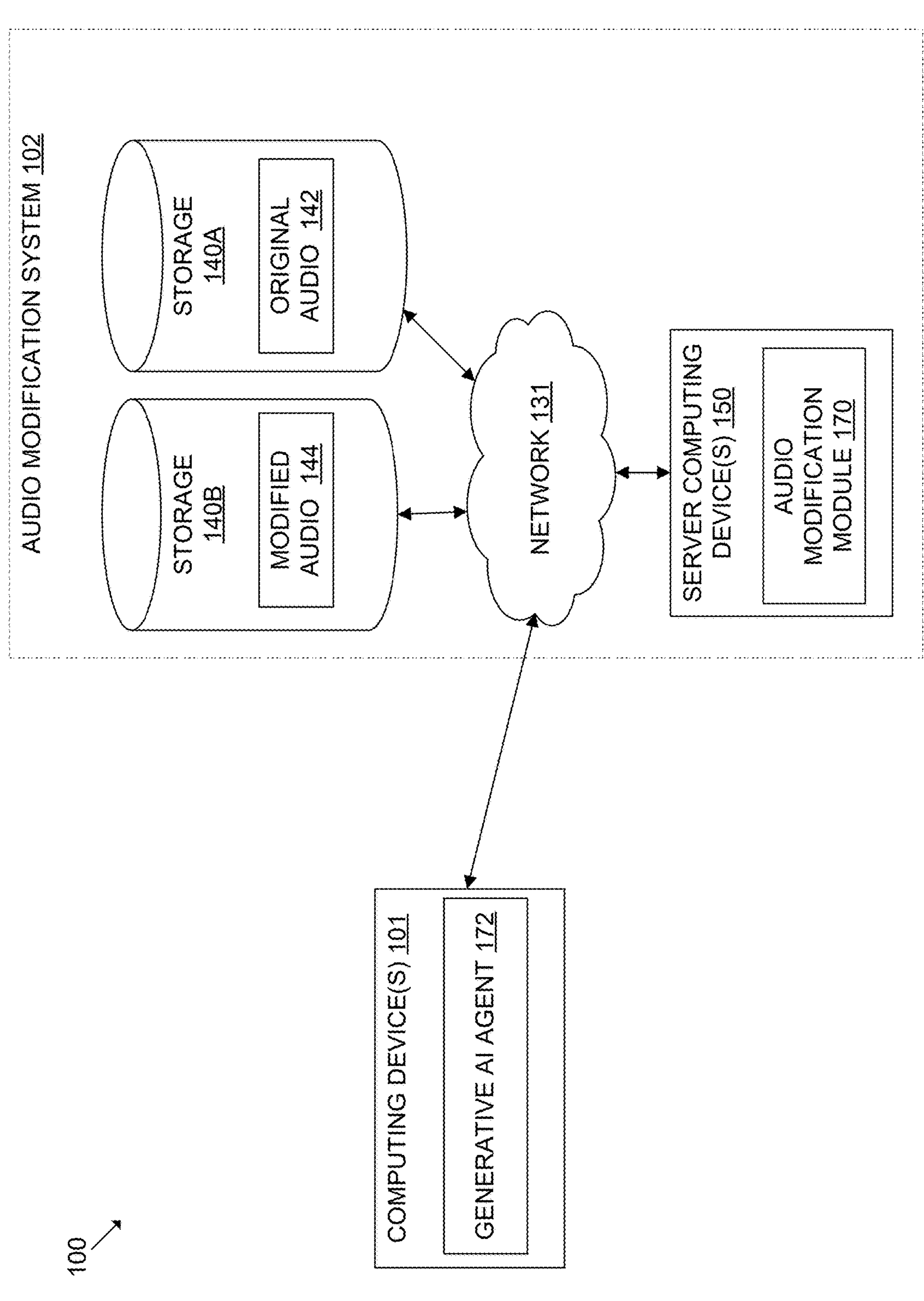
FIG. 1 is a block diagram illustrating a network environment, according to some embodiments of the present disclosure.

Embodiments are described for disrupting generation quality of deep audio generation models. Deep generative artificial intelligence (AI) models can create a variety of types of content, such as text, images, and/or audio. An example of generative AI models are diffusion-based models, which can be used to produce realistic and coherent audio and/or image content based on textual prompts. In the field of image generation and manipulation, latent diffusion models are deep learning probabilistic models that start with random noise, and use a diffusion process to gradually generate a realistic image. A latent diffusion model can include an encoder to compress the input image into a smaller latent representation, a latent diffusion process to manipulate the image by only modifying the latent code, and a decoder to reconstruct a final high-resolution image.

Existing copyrighted works of artists and musicians can be included in the dataset used to train generative models, such as diffusion-based generative AI models, and/or can be provided as seeds during the inference phase of generative models, such as diffusion-based generative AI models. A user can provide a seed to a generative AI model to experiment with different outputs of the model for the same prompt. For example, a user can provide a specific piece of audio (e.g., a melody) as a seed for a generative AI model, and provide a prompt instructing the generative AI model to continue the melody, or to create a version of the melody in a different musical genre (e.g., a heavy metal version of the melody).

Conventional generative AI models lack a useful mechanism to protect existing copyrighted audio works from being exploited by the generative AI model. At best, conventional systems can include a request not to use copyrighted works during the training and/or inference phase of a generative AI model. However, many generative AI models are generating copies of copyrighted works, to the detriment of the copyright holders.

Aspects of the present description address the above-noted and other deficiencies by providing an audio modification system that affects micro-level alterations to audio samples, to trick generative AI models to produce unexpected or inferior results while preserving the sound and quality of the original audio sample. The altered audio generated by the audio modification system sounds, to the human ear, the same as, or very close to, the original audio. However, using the altered audio generated by the audio modification system to train and/or as a seed in a generative AI system for the generation of new content results in unexpected and inferior generated audio.

The audio modification system described herein can be applied to any audio sample, such as a piece of music, an audio book, a news or radio broadcast, sound effects, podcasts, etc. In some embodiments, the audio modification system segments the audio sample into multiple segments, using an adaptive window segmentation approach. The adaptive window segmentation approach segments the audio sample at the zero-crossing points that are closest to the edges of a fixed-sized sliding window. A zero-crossing point is the point at which the amplitude of the audio signal transitions from positive to negative, or from negative to positive, thus crossing the zero amplitude axis on a waveform. Such segmentation can result in the modifications to the audio segment starting and ending at points where the signal is at its baseline (e.g., at zero amplitude), thus facilitating smoother transitions between audio segments and reducing the likelihood that the resulting modified audio includes unwanted sounds, such as clicks or pops. In some embodiments, the segments can overlap by a predetermined amount. In some embodiments, the amount of overlap can vary for each segment. The audio modification system can store the segmentation points (or indexes) in memory.

In some embodiments, the audio modification system can preprocess the audio sample and/or the segments, to identify fundamental components of the audio sample and/or audio segments. The preprocessing can include measuring the perceived loudness of the audio sample and/or of each segment, e.g., using the loudness units full scale (LUFS) metric. The preprocessing can capture the integrated loudness of the audio, which measures the overall loudness of the entire piece of audio, and/or the short-term loudness, which measures loudness over smaller segments. In some embodiments, the segments of the short-term loudness can correspond to the segments generated by the audio modification system, during the segmentation process described above. The audio modification system can store the measured loudness information in memory.

In some embodiments, the preprocessing can include generating a visual representation of the audio and/or of each audio segment. The visual representation of the audio can be in the form of a spectrogram. For example, the audio modification system can utilize a Short-Time Fast-Fourier Transform to compute an amplitude spectrogram of each segment. The preprocessing can also include determining a phase component for each segment. The phase component can be used to restore the audio quality when converting the visual representation of the audio (e.g., the spectrogram) back to audio. The audio modification system can store the phase components and/or the generated spectrograms in memory.

In some embodiments, the audio modification system can generate modified audio of each segment using a trained machine learning model. In some embodiments, the trained machine learning model can receive as input the visual representation of each segment (e.g., the spectrogram). In some embodiments, the trained machine learning model can receive as input the audio of each segment. The trained machine learning model can apply a series of transformations to the input using one or more deep neural network techniques. One technique outputs a modified audio segment that, when used to train a generative model and/or as a seed in a generative model (e.g., a latent diffusion model), interferes with the encoding mechanism, forcing the encoder to associate the input with an unrelated representation. Another technique outputs a modified audio segment that, when used to train a generative model and/or as a seed in a generative model (e.g., a latent diffusion model), leads the generative model to disregard the textual prompt, resulting in the model's output to align with an unrelated target.

In some embodiments, the trained machine learning model outputs a modified visual representation of each audio segment. The modified visual representation of each audio segment can include, for example, a modified spectrogram that includes micro-changes in the frequency domain of the visual representation. The modified visual representations can be converted back to audio, e.g., utilizing an Inverse-Fourier Transform, and combining the converted audio with the stored phase component(s). In some embodiments, the trained machine learning model outputs a modified audio segment for each segment, that includes micro-changes to the frequency domain of the audio segment. The audio modification system can apply the stored loudness metric to each modified audio segment to match the perceived loudness of the original audio sample segment (e.g., the audio modification system can match the stored short-term LUFS metric with the original segment's stored perceived loudness). The audio modification system can combine the modified audio segments to generate a modified audio sample, using the stored segmentation points. For the portions of each segment that overlap with a neighboring segment, the audio modification can apply an average of the frequencies of overlapping portions to produce a smooth acoustic flow between audio segments. The audio modification can modify the loudness of the reconstructed modified audio sample to match the stored loudness metric of the original audio sample in embodiments. For example, the audio modification system can match the integrated loudness of the fully reconstructed modified audio sample to that of the original audio sample, e.g., by applying dynamic range compression and an appropriate amount of gain to the entire reconstructed audio sample, where the appropriate amount of gain is based on the LUFS difference between the original audio and the reconstructed audio. The reconstructed modified audio sample sounds, to the average human listener, the same as the original audio sample. However, when used to train a generative model and/or as a seed in a generative AI model, the reconstructed modified audio sample produces unexpected results. For example, using the reconstructed modified audio sample in a latent diffusion model can interfere with the encoder and/or diffusion mechanisms of the model, thus producing irrelevant or unrealistic outputs.

Aspects of the present disclosure present advantages including, but not limited to, providing audio-content creators protection against their copyrighted works from unauthorized exploitation by generative AI models. Aspects of the present disclosure enable securing of digital content creators' unique styles and creative signatures, and prevents AI models from scraping and mimicking music creation. By preventing generative AI models from producing output that mimics copyrighted works, fewer (or no) computing resources will be used to identify known copyrighted works included in AI-generated samples. Rather than attempting to enforce copyright protection to AI-generated samples, aspects of the present disclosure preemptively impede generative AI models from producing samples that mimic copyrighted works.

FIG. 1 is a block diagram illustrating a network environment 100, in which embodiments of the present disclosure may operate. In one embodiment, network environment 100 includes one or more computing devices (e.g., computing device(s) 101 and/or server computing device(s) 150) connected via network 131. Any number of computing device(s) 101 can communicate with each other and/or with server computing device(s) 150 through network 131. The network 131 can include a local area network (LAN), a wireless network, a telephone network, a mobile communications network, a wide area network (WAN) (e.g., such as the Internet), and/or similar communication system. The network 131 can include any number of networking and computing devices, such as wired and/or wireless devices.

The computing device(s) 101 and server computing device(s) 150 may include one or more physical machines and/or virtual machines hosted by physical machines. The physical machines may include rackmount servers, desktop computers, and/or other computing devices. In one embodiment, the computing device(s) 101 and/or server computing device(s) 150 include a virtual machine managed and provided by a cloud service provider system. Each virtual machine offered by a cloud service provider may be hosted on a physical machine configured as part of a cloud. Such physical machines are often located in a data center. A cloud provider system and cloud may be provided as an infrastructure as a service (IaaS) layer.

Computing device(s) 101, 150 may each include local storage (not shown) for storing an operating system (OS), program, and/or specialized applications to be run on the computing device. Computing device(s) 101, 150 may further include storage for storing media content items, such as audio samples and/or modified audio samples generated by audio modification module 170. The audio samples can be, for example, music (e.g., songs, tracks, etc.), an audio book (or a portion of an audio book), a voice recording, a news or radio broadcast, recorded sound effects, a podcast, or any other type of audio sample. The media content items (e.g., audio items) may also be stored in attached or remote storage, such as in a storage area network (SAN), a network attached storage (NAS), or a cloud storage platform (e.g., storage as a service provided by a cloud service platform). In an example, computing device(s) 101, 150 is connected to storage 140A, 140B, which stores information on original audio 142 and/or modified audio 144.

Audio modification system 102 (which may be an audio modification service in embodiments) may include server computing device(s) 150 and/or storage 140A, 140B. Audio modification system 102 may receive original audio 142 from content owners (e.g., musicians, producers, music labels, etc.), and may process the original audio 142 to generate modified audio 144, which may be stored in storage 140B and/or provided to the third party owners of the audio content. In some embodiments, audio modification system 102 may function as software as a service (SaaS). A content owner may upload original audio 142, and may receive modified audio 144. The content owner may pay a fee for creation of the modified audio, for example. Modified audio 144 may be managed by the audio modification system 102 or may be provided to the content owner without storage of the modified audio in audio modification system 102 for them to use as they see fit.

In some embodiments, the audio modification module 170 of audio modification system 102 can receive original audio as input. In some embodiments, the audio modification module 170 can store the original audio in original audio 142 in storage 140A. The original audio 142 can be any audio recording, such as a piece of music (e.g., a song), audio books (or a portion of an audio book), news or radio broadcasts, voice recording, sound effects, podcasts, etc. The original audio 142 can be a subset or portion of an audio recording. The audio modification module 170 can produce a modified audio 144 that corresponds to the original audio, and can store the modified audio in storage 140B. When the modified audio 144 is provided as training data and/or as a seed for generative AI agent 172, the ability of the generative AI agent 172 to generate new audio that sounds similar to the original audio 142 is constrained. The audio modification module 170 is further described with respect to FIG. 2A. In some embodiments, audio modification module 170 can generate modified audio that interferes with the encoding mechanism of a latent diffusion model (or other generative model). Audio modification module 170 can employ projected gradient descent (PGD) to solve the following equation:

$$\delta_{encoder} = \arg\min_{\|\delta\|_\infty \le \epsilon} \|\mathcal{E}(x+\delta) - z_{targ}\|_2^2$$

where x represents the received audio sample, and $z_{targ}$ refers to a specific target latent representation. For instance, $z_{targ}$ may be the latent representation generated by an encoder of a latent diffusion model from a random input sample. Solving this equation produces minor, barely noticeable disturbances, denoted as $\delta_{encoder}$. These disturbances, when applied to the original audio sample, can create the modified audio that closely resembles the target sample from the viewpoint of the encoder, which causes the latent diffusion model to generate new audio samples that are irrelevant or not realistic.

In some embodiments, audio modification module 170 can generate modified audio that leads interferes with the diffusion mechanism of a latent diffusion model (or other generative model). Audio modification module 170 can solve the following equation:

$$\delta_{diffusion} = \arg\min_{\|\delta\|_\infty \le \epsilon} \|f(x+\delta) - x_{targ}\|_2^2$$

where f is the latent diffusion model, x denotes the input, and $x_{targ}$ is the designated target to be generated. Solving this equation produces an adversarial perturbation, denoted as $\delta_{diffusion}$ that, when applied to the original audio sample leads the latent diffusion model to disregard the textual prompt, thus producing an altered output.

In one embodiment, as shown, storage 140A may store original audio 142 and storage 140B may store modified audio 144. Modified audio 144 may be provided to third parties, such as radio stations, end users, streaming services, etc. on behalf of rights holders of the original audio 142. Additionally, or alternatively, modified audio 144 may be provided to the rights holder(s) of the original audio 142. In embodiments, original audio 142 may not be released. Instead, modified audio 144 may be released, such as on compact discs (CDs), media files (e.g., MP3, AAC, Ogg Vorbis, FLAC, ALAC, WAV, AIFF, DSD, etc. files), records, etc. Modified audio 144 may be modified as described with reference to embodiments herein, which may make the modified audio 144 unsuitable for training of generative models (e.g., of generative AI agent 172) running on computing device 101.

In some embodiments, the computing device 101 (which may be run by a third party) can obtain copies of the modified audio 144, but may not obtain copies of original audio 142 since original audio 142 may not be released to the public. Computing device 101 can run a generative AI agent 172, and train the generative AI agent 172 using modified audio 144. The generative AI agent 172 can be, for example, a latent diffusion model that can generate realistic copies of copyrighted works. Since the modified audio 144 was modified in accordance with embodiments of the present disclosure, the generative AI agent 172 trained on an obtained copy of modified audio 144 is incapable of generating new audio content that reproduces a musical style, voice, type, genre, etc. of the original audio 142. Accordingly, generative AI agent 172 may be incapable of generating AI-generated audio content (e.g., musical content) that end users would associate with the original audio 142.

FIG. 2A is a block diagram of an example audio modification module 170, in accordance with some embodiments of the present disclosure. In general, audio modification module 170 corresponds to the audio modification module 170 of FIG. 1. In some embodiments, audio modification module 170 includes a preprocessing module 272, an ML module 274, and/or a reconstruction module 276. Audio modification module 170 can be coupled to, or have access to, a memory 240, which can store loudness identifiers 242, segmentation points 244, phase 246 data, original segments 248, modified segments 250, and/or modified audio 252.

Alternatively, one or more logics and/or modules of the audio modification module 170 may be distinct modules or logics that are not components of audio modification module 170. Additionally, or alternatively, one or more of the modules or logics may be divided into further modules or logics and/or combined into fewer modules and/or logics.

The audio modification module 170 can receive an original audio sample. The original audio sample can be copyrighted or not. The original audio can be, for example, music (e.g., songs, tracks, etc.), an audio book (or a portion of an audio book), a voice recording, a news or radio broadcast, recorded sound effects, a podcast, or any other type of audio sample.

In some embodiments, the preprocessing module 272 can include a loudness detection component 202, a segmentation component 204, and/or a segment decomposition component 206. The loudness detection component 202 can measure the perceived loudness of the original audio (e.g., as stored in original audio 142 of FIG. 1). In some embodiments, the loudness detection component 202 can measure the perceived loudness of the original audio using the loudness units full scale (LUFS) metric. The LUFS metric is standardized measurement of audio loudness that defines how loud a song should be to match specifications designed by various audio distribution platforms. LUFS can include five metrics: momentary loudness, short-term loudness, integrated loudness, loudness range (LRA), and true peak. In some embodiments, the loudness detection component 202 can determine LUFS metric values by applying a k-weighting filter to the audio, and calculating a root mean square (RMS) level to determine the momentary, short-term, and integrated loudness metrics. The momentary loudness is the RMS of the k-weighted, filtered audio over a specific measurement window. The short-term loudness represents a moving average of the last few seconds of memory loudness values. The integrated loudness averages the short-term loudness values over the entire length of the audio (e.g., of the audio sample, or of each audio sample segment). The loudness range (LRA) is the difference between the highest momentary loudness and lowest momentary loudness within the most frequency loudness range. The true peak metric represents the peak level of a digital-to-analogy conversion of the audio, and can be determined by sampling the audio at an increased frequency (e.g., by oversampling the audio). The loudness detection component 202 can store the LUFS metric(s) in loudness identifiers 242 of memory 240.

The segmentation component 204 can segment the original audio (e.g., as stored in original audio 142) into multiple audio segments. The segmentation component 204 can identify segmentation points and can store the segmentation points in memory 240, as segmentation points 244. In some embodiments, the segmentation component 204 can store the original audio segments as original segments 248.

The segmentation component 204 can segment the original audio into multiple overlapping segments. In some embodiments, the length of each segment can vary. The segmentation component 204 can determine the length of each segment using an adaptive window that is based on a fixed-sized sliding window. In some embodiments, the length of the fixed-sized sliding window can depend on the type of the original audio. For example, the segmentation component 204 can determine to segment a song into multiple overlapping segments based on a fixed-sized sliding window of around 5 seconds in length, and can determine to segment a recording of an audio book into multiple overlapping segments based on a fixed-sized sliding window of around 30 seconds in length. In some embodiments, the segmentation component 204 can determine the fixed-sized sliding window based on the type of the original audio. For example, if the original audio sample is a song, the segmentation component 204 can determine to use a shorter fixed-sized sliding window (e.g., 3 seconds, or 5 seconds); if the frequencies included in the original audio sample is a voice recording, the segmentation component 204 can determine to use a longer fixed-sized sliding window (e.g., 30 seconds, or 1 minute in length). In some embodiments, segmentation component 204 can determine the fixed-sized sliding window based on the range of frequencies included in the original audio. For example, for original audio that includes frequencies within a first range, the segmentation component 204 can determine to use a first fixed-sized sliding window (e.g., 5 seconds); for original audio includes frequencies within a second range (e.g., where the second range includes fewer frequencies than the first range), the segmentation component 204 can determine to use a longer fixed-sized sliding window (e.g., 10 seconds) in length; and so on.

In some embodiments, the segmentation component 204 can determine the fixed-sized sliding window length based on the length of the original audio. For example, different audio sample lengths may be associated with different fixed-size sliding window lengths. A lookup may be performed on a table that associates audio sample lengths to fixed-sized sliding window lengths in some embodiments. For example, if the original audio is more than a threshold length of time (e.g., more than five hours), the segmentation component 204 can determine to use a maximum fixed-size sliding window that corresponds to the threshold length (e.g., 60-second segments). As another example, for original audio that is between 0 and 3 minutes longs, the segmentation component 204 can determine to use a first fixed-sized sliding window (e.g., 5 seconds); for original audio that is between 3 minutes and 10 minutes long, the segmentation component 204 can determine to use a second fixed-sized sliding window (e.g., 10 seconds); for original audio that is between 10 minutes and 30 minutes long, the segmentation component 204 can determine to use a third fixed-sized sliding window value (e.g., 30 seconds); and so on.

In some embodiments, the segmentation component 204 can determine the fixed-sized sliding window value based on a combination of the length of the original audio and the frequencies included in the original audio. To continue the examples provided above, for a song that is long (e.g., longer than 10 minutes) and that includes frequencies that cover the first range, the segmentation component 204 can determine to segment the original audio into short (e.g., around 5-second) segments.

The segmentation component 204 can use an adaptive window to segment the original audio that corresponds to the determined fixed-sized sliding window in some embodiments. The adaptive window segmentation approach segments the audio sample at the zero-crossing points that are closest to the edges of a fixed-sized sliding window in embodiments. A zero-crossing point is the point at which the amplitude of the audio signal transitions from positive to negative, or from negative to positive, thus crossing the zero amplitude axis on a waveform. Such segmentation can result in the edits to the audio single starting and ending at points where the signal is at its baseline (e.g., at zero amplitude), thus facilitating smoother transitions between audio segments and reducing the likelihood that the resulting modified audio includes unwanted sounds, such as clicks or pops. The segmentation component 204 can store the segmentation points (e.g., the beginning and end of each segment) in segmentation points 244.

In some embodiments, the segments can overlap by a predetermined amount. In some embodiments, the amount of overlap can vary. In some embodiments, the amount of overlap can be dependent on the average length of the segments (e.g., on the determined fixed-sized sliding window). For example, the amount of overlap can be a percentage of the average length of the segments (e.g., 1% or 5%). In some embodiment, the overlap can be a predetermined fixed amount. The amount of overlap can be stored in segmentation points 244.

In some embodiments, the loudness detection component 202 can determine a loudness metric (e.g., the LUFS short-term loudness metric) for each segment, as generated by segmentation component 204. The loudness detection component 202 can store the loudness metric for each segment in loudness identifiers 242.

In some embodiments, the segment decomposition component 206 can determine and store the phase of each segment. The segment decomposition component 206 can extract the phase by the complex spectrum computed from the Fourier Transform. For example, by performing the Short-Time Fourier Transform on each segment, the segment decomposition component 206 obtains a phase spectrum for each segment time frame. Collectively, the phase spectrum for each segment time frame provides a comprehensive view of how the audio signal's phase evolves over time. The segment decomposition component 206 can store the phase of each segment in phase 246. In some embodiments, the segment decomposition component 206 can generate a visual representation of each segment. The visual representation can be a spectrogram, such as an amplitude spectrogram, a MEL spectrogram, a log-frequency spectrogram, a chroma spectrogram, a cepstrogram, a harmonic-percussive sound separation (HPSS) spectrogram, or a Mel-Frequency Cepstral Coeffecients (MFCC) spectrogram, or can be some other visual representation of the audio segment. In some embodiments, the segment decomposition component 206 can use the Short-Time Fast-Fourier-Transform to generate the spectrogram. In some embodiments, the visual representation can be a one-dimensional feature vector that represents frequencies over a particular time period. For example, segment decomposition component 206 can perform statistical analyses on a spectrogram representation of a segment of the received audio sample to produce a one-dimensional feature vector representation of the audio sample. In some embodiments, the visual representation can be a two-dimensional feature vector representation of a segment of the received audio sample, or some other representation of a segment of the received audio sample. In some embodiments, the segment decomposition component 206 can store the visual representation of each segment in original segments 248 of memory 240.

The machine learning (ML) module 274 can include one or more ML models, such as the spectrogram-based encoder ML model 212, the spectrogram-based diffusion ML model 214, the audio-based encoder ML model 216, and/or the audio-based diffusion ML model 218. The spectrogram-based encoder ML model 212 and/or the spectrogram-based diffusion ML model 214 can be trained ML models that receive as input a visual representation of each audio segment (e.g., as generated by the segmentation component 204 and stored in original segments 248). The visual representation can be or include a spectrogram, such as a full-spectrogram representation or a MEL spectrogram. Other spectrograms or other image representations of audio can be used in the ML models 212-214. The spectrogram-based encoder ML model 212 and/or the spectrogram-based diffusion ML model 214 can map the input to a representation of irrelevant audio (e.g., to a 2-dimensional image representing a spectrogram of irrelevant audio target output, such as a grey image). The spectrogram-based encoder ML model 212 and/or the spectrogram-based diffusion ML model 214 can provide, as output, a modified spectrogram of each audio segment. The spectrogram-based ML models 212, 214 can use a trained machine learning model such as a deep neural network to estimate and apply micro-modifications to the frequencies of the input. The micro-modifications may be small enough that they do not impact an audio quality of an audio sample recreated from modified audio segments, but may be sufficient to foil training of generative models. The spectrogram-based ML models 212, 214 can store the output in modified segments 250. Each modified spectrogram provided as output is almost identical, on a macro-scale, to the original spectrogram provided as input. However, the modified spectrograms provided as output from the ML models 212 and/or 214 are significantly different from the spectrograms received as input on a micro-scale (e.g., across neighboring frequencies). An example change in the input spectrogram compared to the output spectrogram is described with respect to FIG. 5. When used to reconstruct the audio, the micro-scale differences of the modified spectrograms do not affect the sound of the audio. However, when used to train a generative model and/or as a seed in a generative model (e.g., a latent diffusion model) to create new content, the reconstructed audio of the modified spectrograms can significantly affect the generated output of the latent diffusion model, leading to low-quality and/or irrelevant generated content.

Latent diffusion models include an encoder mechanism that transforms their received input into a latent vector representation, which is subsequently used to create a new output. The spectrogram-based encoder ML model 212 can be trained to output a modified spectrogram that interferes with the encoder of a latent diffusion model, and with other types of generative models. Thus, the output of the spectrogram-based encoder ML model 212, when used to train a generative model and/or as a seed for a generative model, forces the encoder of the generative model to associate the input with an unrelated sample. As a result, the latent diffusion model produces new samples that are irrelevant and/or unrealistic outputs.

The spectrogram-based diffusion ML model 214 can be trained to output a modified spectrogram that, when used to train a generative model and/or as a seed for a generative model, interferes with a diffusion mechanism of the generative model (e.g., of a latent diffusion model). The spectrogram-based diffusion ML model 214 alters the spectrogram received as input to produce a modified spectrogram as output that, when used to train a generative model and/or as a seed for a generative model (e.g., a latent diffusion model), leads the generative model to align with an unrelated target. For example, using the modified spectrogram(s) received as output form the spectrogram-based diffusion model 214 in a latent diffusion model causes a latent diffusion model to disregard the textual prompt, resulting in an altered output from the latent diffusion model.

In some embodiments, the spectrogram-based ML models 212 and/or 214 can produce outputs that modify only a portion of the input spectrogram(s), thus preserving a part of the original frequency content. The spectrogram-based ML models 212, 214 can apply the modifications to the spectrogram(s) received as input to a subset of the spectrogram, e.g., to a specific range of frequencies represented in the spectrogram, while leaving the rest of the spectrogram unmodified. For example, the spectrogram-based ML models 212, 214 can modify the portion of the input spectrograms that correlate to frequencies below 100 Hertz. The range of frequencies modified by the spectrogram-based ML models 212, 214 can be determined by the ML module 274, and can depend on a number of factors, such as the overall range of frequencies represented in the original audio, the length of the original audio, the type of the original audio (e.g., whether the audio is music, a recording of an audio book, a podcast, sound effects, etc.), and/or based on input provided by a user.

The audio-based encoder ML model 216 and/or the audio-based diffusion ML model 218 can function in a similar fashion as the corresponding spectrogram-based ML models 212, 214 described above. However, the audio-based ML models 216, 218 can receive audio as input, rather than a visual representation of the audio. The input can be a multidimensional vector. The audio-based encoder ML model 216 and/or the audio-based diffusion ML model 218 can map the input to an irrelevant or unrelated audio sample. The audio-based encoder ML model 216 and/or the audio-based diffusion ML model 218 can use a deep neural network to reconstruct the input audio influenced by the random audio that was given as a constraint. The audio-based encoder ML model 216 and/or the audio-based diffusion ML model 218 can provide, as output, modified audio of each audio segment. The audio-based ML models 216, 218 can store the output in modified segments 250. Each modified audio provided as output sounds almost identical to the original audio provided as input. However, the modified audio provided as output from the ML models 216, 218 are significantly different from the original audio received as input on a micro-scale. Thus, when used to reconstruct the audio, the micro-scale differences of the modified audio do not affect the sound of the audio. However, when used to train, and/or as a seed provided to, a latent diffusion model or other generative model to create new content, the reconstructed modified audio can significantly affect the generated output of the latent diffusion model, leading to low-quality and/or irrelevant generated content. Similar to the spectrogram-based encoder ML model 212, the audio-based encoder ML model 216 can output modified audio that, when used to train and/or as a seed for a latent diffusion model, forces the encoder of an latent diffusion model to associate the input with an unrelated sample. As a result, the latent diffusion model produces new samples that are irrelevant and/or unrealistic outputs. Similar to the spectrogram-based diffusion ML model 214, the audio-based diffusion ML model 218 can output modified audio that, when used to train and/or as a seed for a latent diffusion model, leads the latent diffusion model to align with an unrelated target. The ML models 212-218 are further described with respect to FIG. 3.

The reconstruction module 276 can include a segment reconstruction component 232, an audio reconstruction component 234, and/or a loudness matching component 236.

In some embodiments, the segment reconstruction component 232 can convert the modified spectrogram(s) output by the spectrogram-based ML models 212 and/or 214 to audio. The segment reconstruction component 232 can utilize the Inverse-Fourier Transform to reconstruct the audio of each modified spectrogram, corresponding to each segment. The segment reconstruction component 232 can apply the stored phase 246 of each corresponding segment to convert the modified spectrogram to audio segments. In some embodiments, the segment reconstruction component 232 can match the loudness of each segment to the stored loudness identifiers 242 for each reconstructed audio segment. For example, the segment reconstruction component 232 can identify the short-term LUFS metric stored in loudness identifiers 242, and can match the loudness of each segment to the short-term LUFS metric of the original corresponding segment by amplifying the modified audio segment and/or reducing a loudness of the modified audio segment. The segment reconstruction component 232 can match the loudness of each segment by applying a flat gain to the segment based on the LUFS difference between the original segment and the modified segment.

The audio reconstruction component 234 can use the segmentation points 244, corresponding to the time offsets in the original audio sample used to generate segments, to stitch the audio segments back together. The audio reconstruction component 234 can account for the overlap of each segment by taking the average of the overlapping segment portions to provide a smooth acoustic flow between audio segments. In some embodiments, the audio reconstruction component 234 can implement a plain average between the overlapping portions. In some embodiments, the audio reconstruction component 234 can implement a weighted average between the overlapping portions. The average can be weighted based on similarity to the original segments, and/or based on the loudness level of the segments. For example, the audio reconstruction component 234 can measure a difference between the overlapping portions of the modified segment and the original segment. Based on the difference, the audio reconstruction component 234 can generate a difference value for each modified segment. The audio reconstruction component 234 can weight the average of the overlapping portions more heavily toward the segment that has the smaller difference value. The audio reconstruction component 234 can weight the overlapping portions of the segments based on the loudness of the modified segments. For example, the modified segment with a higher measured loudness can be weighted more heavily when taking the average of the overlapping portion of the segments. Once reconstructed, the audio reconstruction component 234 can store the reconstructed audio in modified audio 252.

The loudness matching component 236 can match the loudness of the reconstructed modified audio 252 to the original audio. The loudness matching component 236 can identify the loudness identifiers 242 in memory 240 and can modify the loudness of the reconstructed modified audio to match the loudness identifiers of the original audio. For example, the loudness matching component 236 identify the integrated loudness LUFS metric stored in loudness identifiers 242, and can modify the loudness of the reconstructed modified audio 252 to match the integrated loudness metric of the original audio. For example, the loudness matching component 236 can apply a flat gain to the modified audio 252 based on the LUFS metric difference between the original audio and the modified audio.

In embodiments, multiple segments may be processed in parallel (e.g., in different threads, by different processors, by different processor cores, etc.). Accordingly, modified versions of multiple audio segments may be generated in parallel, thus speeding up the process of generating a modified version of an audio sample.

Figure 2B:
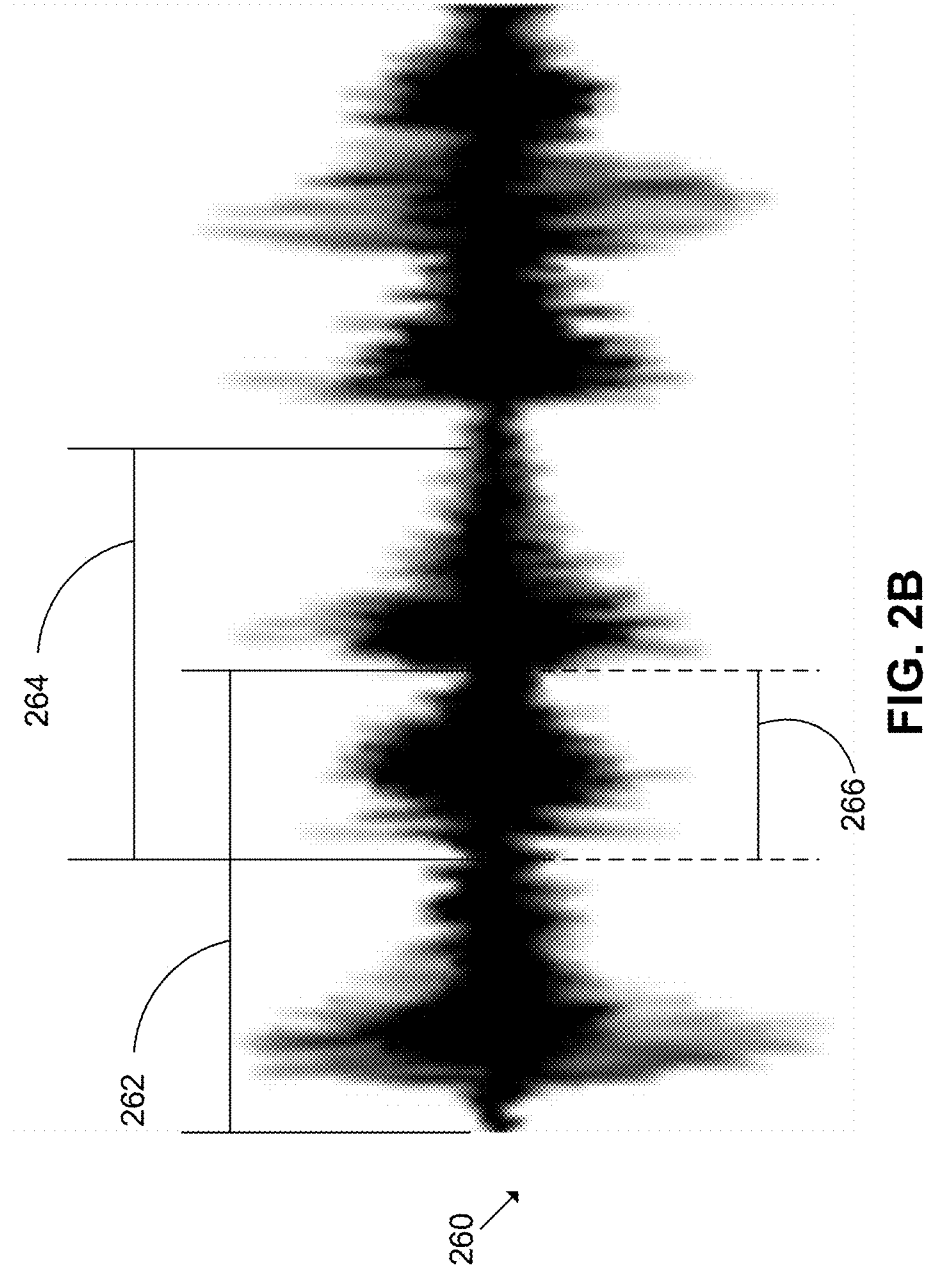
FIG. 2B illustrates an audio sample segmented into overlapping segments, according to some embodiments of the present disclosure.

FIG. 2B illustrates an audio sample 260 segmented into overlapping segments 262, 264 having different lengths. As shown, the segments 262, 264 overlap at an overlap region 266. Each of segment 262 and segment 264 may be separately processed to generate modified audio segments. The overlap region 266 of a modified version of audio segment 262 and the overlap region 266 of a modified version of audio segment 264 may not match. Accordingly, the overlap regions 266 from the two modified audio segments may be combined (e.g., averaged) when the modified audio segments are recombined to recreate a modified version of audio sample 260.

FIG. 3 is a workflow 300 for training a machine learning model to generate modified audio samples, in accordance with some embodiments of the present disclosure. The workflow 300 may be performed by processing logic executed by a processor of a computing device. The workflow 300 may be implemented, for example, by one or more audio modification module 170 executing on a processing device 602 of computing device 600 shown in FIG. 6. In some embodiments, the workflow 300 may correspond to any of, or all of, ML models of ML module 274 of FIG. 2A. The operations and/or methods described with reference to FIG. 3 may be performed by processing logic that may comprise hardware (e.g., circuitry, dedicated logic, programming logic, microcode, etc.), software (e.g., instructions run on a processing device to perform hardware simulation), or a combination thereof.

Training dataset 305 can contain hundreds, thousands, tens of thousands, hundreds of thousands, or more, of audio signals (e.g., pieces of audio, or visual representations of audio, such as spectrograms). To construct the training dataset 305, processing logic generates training input and target output for the training input. The training input can include audio signals 312 and/or visual representations of audio signal 314 (e.g., spectrograms). In some embodiments, the training dataset 305 can include audio signals 312, and can be used to train audio-based ML models (e.g., ML models 216 and/or 218 of FIG. 2A). In some embodiments, the training dataset 305 can include visual representations 314, and can be used to train spectrogram-based ML models (e.g., ML models 212 and/or 214 of FIG. 2A). Training module 320 can train an ML model 330 for each ML model 212-218 of FIG. 2A. In some embodiments, training dataset 305 can include both audio and visual representations of audio, and the training module 320 can train an ML model for both audio-based and spectrogram-based ML models.

The training dataset 305 is provided as input to a training module 320 to train a machine learning model 330. One type of machine learning model 330 that may be used is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a neural network and other types of machine learning models may be achieved in a supervised learning manner, which involves feeding a training dataset consisting of labeled inputs through the network or other model, observing its outputs, defining an error (by measuring the difference between the outputs and the label values), and using techniques such as deep gradient descent and backpropagation to tune the weights of the network or other model across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

A training dataset containing hundreds, thousands, tens of thousands, hundreds of thousands or more data points can be used to form the training dataset 305. In embodiments, up to millions of audio signals are included in a training dataset. Each data point may include, for example, an audio signal or a representation of an audio signal. The representation can be, for example, a multi-dimensional representation of audio, or a one-dimensional vector representation of audio. This data may be processed to generate one or multiple training datasets 305 for training of one or more machine learning models 330. The machine learning models 330 may be trained, for example, to output modified audio samples corresponding to the input audio samples.

Training may be performed by inputting one or more of the data points into the machine learning model one at a time. Each input may include an audio sample segment. The data that is input into the machine learning model may include a single layer or multiple layers. In some embodiments, a recurrent neural network (RNN) is used. In such an embodiment, a second layer may include a previous output of the machine learning model (which resulted from processing a previous input).

The machine learning model processes the input to generate an output. An artificial neural network includes an input layer that consists of values in a data point (e.g., intensity values and/or height values of pixels in a height map). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce. For example, for an artificial neural network being trained to output modifications to the input, e.g., corresponding to a frequency (or frequency range) of the input.

Processing logic may then compare the generated modifications to the known condition and/or label that was included in the training data item. Processing logic determines an error (i.e., a classification error) based on the differences between the output probability map and/or label(s) and the provided probability map and/or label(s). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons," where each layer receives input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the model. After one or more rounds of training, processing logic may determine whether a stopping criterion has been met. A stopping criterion may be a target level of accuracy, a target number of processed data items from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model 330. Testing the model 330 can include performing unit tests, regression tests, and/or integration tests.

Once the ML model 330 has been trained, the audio modification module 170 can use the ML model 330 to produce modified audio segments of received original audio. That is, audio modification module 170 may provide, as input to ML model 330, one or more original audio segments (e.g., either audio-based or spectrogram-based). ML model 330 may provide, as output, a modified audio 350 (e.g., either audio-based or spectrogram-based) for each audio segment 340. In some embodiments, the modified audio 350 can include modifications to frequency(ies) of the original audio 340 that, when applied to the original audio, generate a modified audio segment sample.

Multiple ML models 330 can be trained and used in combination. For example, one ML model 330 can correspond to spectrogram-based encoder ML model 212, one ML model 330 can correspond to spectrogram-based diffusion model 214, one ML model 330 can correspond to audio-based encoder ML model 216, and one ML model can correspond to audio-based diffusion ML model 218. Each ML model 330 can be trained using a different training algorithm, as described above. There is no limit to the number of ML models 330 that can be trained and used to generate modified audio 350.

FIG. 4 is a flow diagram illustrating a method 400 for generating a modified audio sample, in accordance with some embodiments of the present disclosure. Method 400 may be performed by processing logic that comprises hardware (e.g., circuitry, dedicated logic, programmable logic, microcode, etc.), software (e.g., instructions run or executed on a processor), firmware, or a combination thereof. Method 400 may be performed, for example by one or more of computing devices 101A-B and/or server computing device 150 of FIG. 1 in embodiments. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, processing logic segments an audio signal into a plurality of audio signal segments. In some embodiments, the audio signal segments can overlap by a determined fixed or variable amount. The determined amount can correspond to a length of a corresponding audio signal segment. For example, a first audio signal segment can overlap with a second audio signal segment, and the amount of overlap can be a percentage of the average length of the first audio signal segment and the second audio signal segment (e.g., can be 1% of the average length, or 5% of the average length). In some embodiments, processing logic can determine the length of each audio signal segment based on an adaptive window that segments the audio signal at a zero-crossing point that is closest to the edge of a fixed-sized window.

In some embodiments, processing logic determines a loudness estimation of the audio signal. In some embodiments, processing logic determines a loudness estimation of each of the plurality of audio signal segments. The loudness estimation can reflect the perceived loudness of the original audio (either of the complete audio signal, or the original audio of each audio signal segment). Processing logic can determine the loudness estimation (of the complete audio signal and/or of each audio signal segment) using the loudness units full scale (LUFS) metric. Processing logic can store the LUFS metric(s) in memory.

In some embodiments, processing logic can decompose the audio sample segments. Processing logic can determine a phase component of an audio signal segment of the plurality of audio signal segments. Processing logic can store the phase component(s) in memory. Phase describes where a periodic waveform is in its current cycle. The stored phase components can be used when reconstructing the audio sample from the segments, as further described at operation 430.

In some embodiments, processing logic can generate a visual representation of the audio signal segment. The visual representation can be a spectrogram of the audio signal segment. A spectrogram is a graph that displays the strength of a signal over time for a given frequency range. A spectrogram can be a multidimensional matrix. The spectrogram can be an amplitude spectrogram, a MEL spectrogram, or another type of spectrogram. In some embodiments, the visual representation can be an image of the spectrogram. In some embodiments, the visual representation can be a one-dimensional vector that represents frequencies over a particular time period (e.g., corresponding to the segment length).

At operation 420, process logic generates a plurality of modified audio signal segments based on processing data from the plurality of audio signal segments using a trained machine learning model. The plurality of modified audio signal segments are indistinguishable from the plurality of audio signal segments to an average human listener. In some embodiments, the modified audio signal segments are indistinguishable to any human listener. In some embodiments, the modified audio signal segments may be in frequencies that are not audible to humans, for example. In some embodiments, the modifications to the audio signal segments are in the audible frequency ranges detectable by humans, but the modifications are minimal enough that they are not detectable by humans.

In some embodiments, processing logic can use the generated visual representation (e.g., spectrogram) of each audio signal segment to generate the modified audio signal segments. Processing logic can provide, as input to the trained machine learning model, the visual representation of the audio signal segment. Processing logic receives, as output from the trained machine learning model, a modified visual representation of the audio signal segment. In some embodiments, the trained machine learning model is trained to generate micro-changes in the frequency domain of the input (e.g., of the spectrogram). Processing logic can convert the modified visual representation of the audio signal segment to a modified audio signal segment using the stored phase component. In some embodiments, the trained machine learning model can perform the functions of the spectrogram-based encoder ML model 212 of FIG. 2A, and the modified audio signal segment can include micro-changes to the frequencies represented in the spectrogram that, when used to train and/or as a seed in a trained generative ML model (such as a latent diffusion model), interferes with the encoding mechanism of the trained generating ML model, and causes the encoding mechanism to associate the input with an unrelated target. Thus, the trained generative ML model generates a new audio signal that is irrelevant or unrealistic. In some embodiments, the trained machine learning model can perform the functions of the spectrogram-based diffusion ML model 214 of FIG. 2A, and the modified audio signal segment can include micro-changes to the frequencies represented in the spectrogram that, when used to train and/or a seed in a trained generative ML model (such as a latent diffusion model), pushes the diffusion model into disregarding the textual prompt, thus producing a an unrealistic or irrelevant output.

In some embodiments, processing logic can use the audio signal segments to generate the modified audio signal segments. Thus, processing logic can provide, as input to the trained machine learning model, an audio signal segment of the plurality of audio signal segments. The input can be a multidimensional vector. Processing logic can receive, as output from the trained machine learning model, a modified audio signal segment that corresponds to the input audio signal segment. In some embodiments, the trained machine learning model can perform the functions of the audio-based encoder ML model 216 of FIG. 2A, and the modified audio signal segment can include micro-changes to the frequencies of the audio that, when used to train and/or as a seed in a trained generative ML model (such as a latent diffusion model), interferes with the encoding mechanism of the trained generating ML model, and causes the encoding mechanism to associate the input with an unrelated target. Thus, the trained generative ML model generates a new audio signal that is irrelevant or unrealistic. In some embodiments, the trained machine learning model can perform the functions of the audio-based diffusion ML model 218 of FIG. 2A, and the modified audio signal segment can include micro-changes to the frequencies of the audio that, when used to train and/or a seed in a trained generative ML model (such as a latent diffusion model), pushes the diffusion model into disregarding the textual prompt, thus producing a an unrealistic or irrelevant output.

At operation 430, processing logic generates a reconstructed audio signal corresponding to the audio signal, by combining the plurality of modified audio signal segments. The reconstructed audio signal is indistinguishable from the audio signal to the average listener, but, when used to a train generative machine learning model, constrains the ability of the trained generative machine learning model to generate new audio signals similar to the audio signal. The modifications to the audio signal does not negatively impact a sound quality of the audio signal, and may be completely undetectable to humans in embodiments.

In some embodiments, processing logic can modify the loudness of the reconstructed audio signal to approximately match the loudness estimation of the audio signal. In some embodiments, processing logic can modify the loudness of each modified audio signal segment to approximately match the loudness estimation of the corresponding audio signal segment.

In some embodiments, processing logic generates the plurality of modified audio signal segments for a subset of frequencies of each audio signal segment. Processing logic can then combine the modified audio signal segments for the subset of frequencies with the remainder of frequencies of the audio signal segments. In some embodiments, processing logic can separate the audio signal into a plurality of frequency ranges. The processing logic can modify one or more of the frequency ranges, and then combine the modified frequency range(s) with the unmodified frequency range(s) to generate the modified audio signal. For example, processing logic can separate the audio signal into high frequencies, middle frequencies, and low frequencies. Processing logic can then perform operations 410-430 to modify the audio of one (or more) of the frequency ranges. For example, processing logic can modify the high frequency audio. Processing logic can then combine the modified audio with the unmodified audio of the other frequency ranges. For example, after generating modified audio for the high frequency range audio, processing logic can combine the modified high frequency audio with the unmodified middle and low frequency audio, to generate a reconstructed audio sample. Note that fewer than, or more than three frequency ranges can be used. The frequency ranges can be determined based on a number of factors, such as the overall range of frequencies represented in the original audio, the length of the original audio, the type of the original audio (e.g., whether the audio is music, a recording of an audio book, a podcast, sound effects, etc.), and/or based on input provided by a user.

FIG. 5 illustrates the effects of the audio modification module 170 on a spectrogram, according to embodiments of the present disclosure. FIG. 5 illustrates a spectrogram of an original audio sample 510A. Spectrogram of the original audio sample 510B illustrates a portion of the spectrogram 510A. In some embodiments, audio modification module 170 can provide the spectrogram of the original audio sample 510A,B can as input to the ML module 274 of FIG.

2A, which can provide as output the spectrogram of the modified audio sample 520A,B. FIG. 5 illustrates the micro-level changes between the spectrogram of the original audio sample 510B and the spectrogram of the modified audio sample 520B. The audio modification module 170 can use the spectrogram of the modified audio sample 520A,B to reconstruct the audio, creating a modified audio sample that sounds, to the average human listener, indistinguishable from the original audio sample. However, when the reconstructed audio is used to train, and/or as a seed for, a generative AI model, constrains the ability of the generative AI model to generate new audio similar to the original audio.

Figure 6:
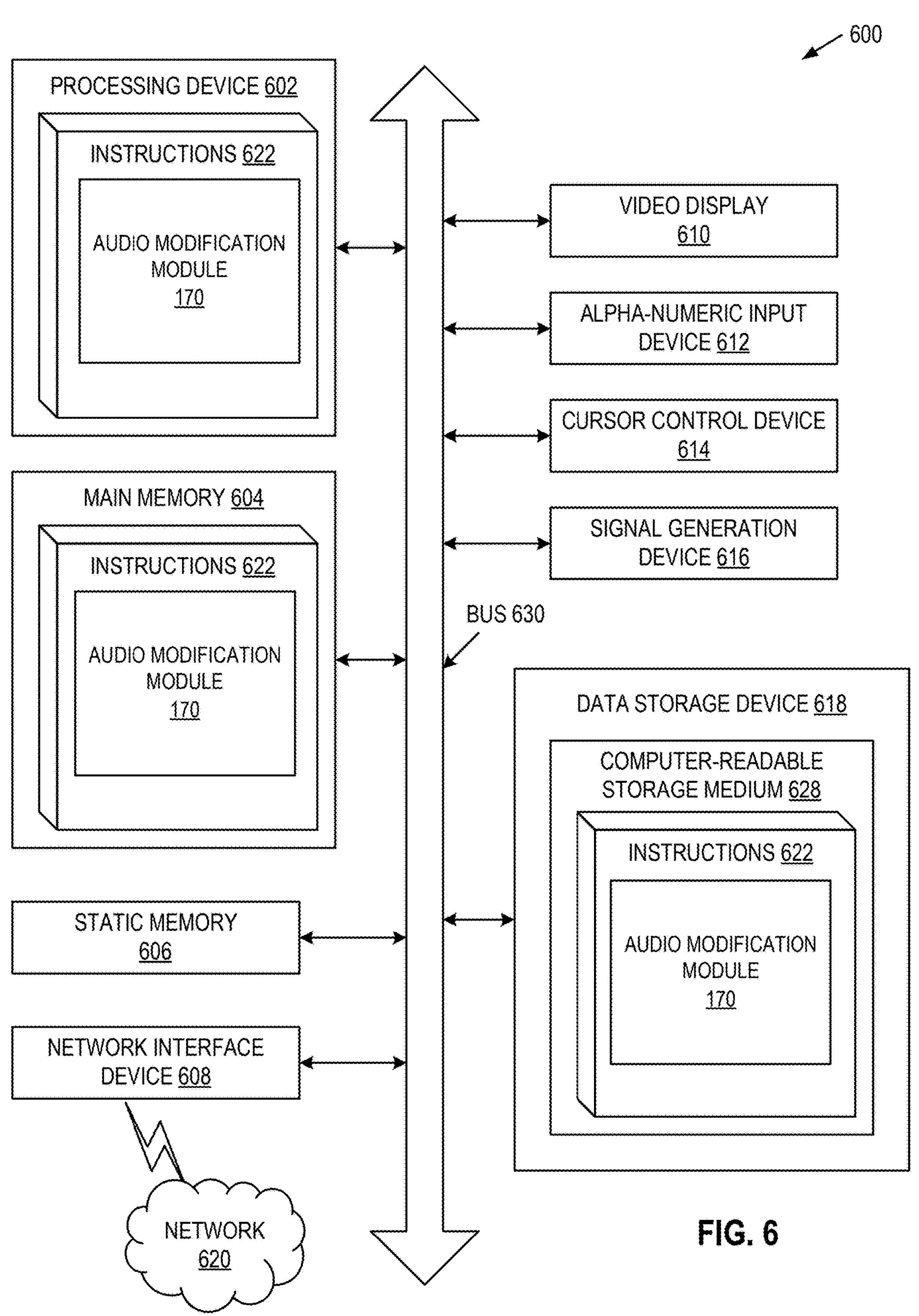
FIG. 6 is a block diagram illustrating an exemplary computer system, according to some embodiments of the present disclosure.

FIG. 6 illustrates a diagrammatic representation of a machine in the exemplary form of a computing device 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server computing device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computing device 600 may represent computing devices 101A-B, and/or server computing device 150, as shown in FIG. 1.

The computing device 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the audio modification module 170 for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions 622 (e.g., instructions of audio modification module 170) embodying any one or more of the methodologies or functions described herein. The instructions 622 may also reside, completely or at least partially, within the main memory 604 and/or within processing logic 626 of the processing device 602 during execution thereof by the computing device 600 (also referred to as a computer system), the main memory 604 and the processing device 602 also constituting computer-readable media. The instructions may further be transmitted or received over a network 620 via the network interface device 608.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "comparing", "selecting", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. In addition, embodiments of the present disclosure are not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

segmenting an audio signal into a plurality of audio signal segments;

generating a plurality of modified audio signal segments based on processing data from the plurality of audio signal segments using a trained machine learning model, wherein the plurality of modified audio signal segments are indistinguishable from the plurality of audio signal segments to an average human listener; and generating a reconstructed audio signal corresponding to the audio signal by combining the plurality of modified audio signal segments, wherein the reconstructed audio signal is indistinguishable from the audio signal to the average human listener but, when used to train a generative machine learning model, constrains an ability of the trained generative machine learning model to generate new audio signals similar to the audio signal.

2. The method of claim 1, further comprising:

determining a loudness estimation of the audio signal; and modifying a loudness of the reconstructed audio signal to approximately match the loudness estimation of the audio signal.

3. The method of claim 1, further comprising:

determining a loudness estimation of each of the plurality of audio signal segments; and modifying a loudness of each of the modified audio signal segments to approximately match the loudness estimation of a corresponding audio signal segment of the plurality of audio signal segments.

4. The method of claim 1, further comprising:

determining a phase component of an audio signal segment of the plurality of audio signal segments; and generating a visual representation of the audio signal segment.

5. The method of claim 4, further comprising:

providing, as input to the trained machine learning model, the visual representation of the audio signal segment;

receiving, as output from the trained machine learning model, a modified visual representation of the audio signal segment; and converting, using the phase component, the modified visual representation of the audio signal segment to a modified audio signal segment of the plurality of modified audio signal segments.

6. The method of claim 4, wherein the visual representation of the audio signal segment comprises a spectrogram of the audio signal segment, wherein the spectrogram is at least one of an amplitude spectrogram, a MEL spectrogram, a log-frequency spectrogram, a chroma spectrogram, a cepstrogram, a harmonic-percussive sound separation spectrogram, or a Mel-Frequency Cepstral Coefficients spectrogram.

7. The method of claim 1, further comprising:

providing, as input to the trained machine learning model, an audio signal segment of the plurality of audio signal segments; and receiving, as output from the trained machine learning model, a modified audio signal segment of the plurality of modified audio signal segments, wherein the modified audio signal segment corresponds to the audio signal segment.

8. The method of claim 1, wherein the trained machine learning model is trained to output micro-changes in a frequency domain of received input that, when used to train the generative machine learning model, interferes with at least one of: an encoder mechanism of the generative machine learning model or a diffusion mechanism of the generative machine learning model.

9. The method of claim 1, wherein the plurality of audio signal segments overlap by a determined amount, wherein the determined amount corresponds to a length of a corresponding audio signal segment.

10. The method of claim 1, wherein segmenting the audio signal into the plurality of audio signal segments comprises:

determining a length of an audio signal segment of the plurality of audio signal segments, wherein the length is based on an adaptive window that segments the audio signal at a zero-crossing point that is closest to an edge of a fixed-sized window.

11. The method of claim 1, wherein generating the plurality of modified audio signal segments comprises:

generating the plurality of modified audio signal segments for a subset of frequencies of each audio signal segment; and combining the modified audio signal segments for the subset of frequencies with a remainder of frequencies of audio signal segments, wherein the remainder of frequencies is not included in the subset of frequencies of each audio signal segment.

12. A system comprising:

a memory; and a processing device operatively coupled to the memory, the processing device to perform operations comprising:

segmenting an audio signal into a plurality of audio signal segments;

generating a plurality of modified audio signal segments based on processing data from the plurality of audio signal segments using a trained machine learning model, wherein the plurality of modified audio signal segments are indistinguishable from the plurality of audio signal segments to an average human listener; and generating a reconstructed audio signal corresponding to the audio signal by combining the plurality of modified audio signal segments, wherein the reconstructed audio signal is indistinguishable from the audio signal to the average human listener but, when used as a seed provided to a trained generative machine learning model, constrains an ability of the trained generative machine learning model to generate new audio signals similar to the audio signal.

13. The system of claim 12, wherein the operations further comprise:

determining a phase component of an audio signal segment of the plurality of audio signal segments; and generating a visual representation of the audio signal segment.

14. The system of claim 13, wherein the operations further comprise:

providing, as input to the trained machine learning model, the visual representation of the audio signal segment;

receiving, as output from the trained machine learning model, a modified visual representation of the audio signal segment; and converting, using the phase component, the modified visual representation of the audio signal segment to a modified audio signal segment of the plurality of modified audio signal segments.

15. The system of claim 13, wherein the visual representation of the audio signal segment comprises a spectrogram of the audio signal segment, wherein the spectrogram is at least one of an amplitude spectrogram, a MEL spectrogram, a log-frequency spectrogram, a chroma spectrogram, a cepstrogram, a harmonic-percussive sound separation (HPSS) spectrogram, or a Mel-Frequency Cepstral Coeffecients (MFCC) spectrogram.

16. The system of claim 12, wherein the operations further comprise:

providing, as input to the trained machine learning model, an audio signal segment of the plurality of audio signal segments; and receiving, as output from the trained machine learning model, a modified audio signal segment of the plurality of modified audio signal segments, wherein the modified audio signal segment corresponds to the audio signal segment.

17. The system of claim 12, wherein segmenting the audio signal into the plurality of audio signal segments comprises:

determining a length of an audio signal segment of the plurality of audio signal segments, wherein the length is based on an adaptive window that segments the audio signal at a zero-crossing point that is closest to an edge of a fixed-sized window.

18. The system of claim 12, wherein generating the plurality of modified audio signal segments comprises:

generating the plurality of modified audio signal segments for a subset of frequencies of each audio signal segment; and combining the modified audio signal segments for the subset of frequencies with a remainder of frequencies of audio signal segments, wherein the remainder of frequencies is not included in the subset of frequencies of each audio signal segment.

19. The system of claim 12, wherein the trained machine learning model is trained to output micro-changes in a frequency domain of received input that, when used as the seed provided to the generative machine learning model, interferes with at least one of: an encoder mechanism of the generative machine learning model, or a diffusion mechanism of the generative machine learning model.

20. A non-transitory computer readable medium comprising instructions that, when executed by a processing device, cause the processing device to perform operations comprising:

segmenting an audio signal into a plurality of audio signal segments;

generating a plurality of modified audio signal segments based on processing data from the plurality of audio signal segments using a trained machine learning model, wherein the plurality of modified audio signal segments are indistinguishable from the plurality of audio signal segments to an average human listener; and generating a reconstructed audio signal corresponding to the audio signal by combining the plurality of modified audio signal segments, wherein the reconstructed audio signal is indistinguishable from the audio signal to the average human listener but, when used to train a generative machine learning model, constrains an ability of the trained generative machine learning model to generate new audio signals similar to the audio signal.

* * * * *